US009641044B2

(12) United States Patent
Drennen et al.

(10) Patent No.: US 9,641,044 B2
(45) Date of Patent: May 2, 2017

(54) INTEGRAL ACTUATOR DESIGN

(71) Applicant: GOODRICH CORPORATION, Charlotte, NC (US)

(72) Inventors: David Drennen, Bellbrook, OH (US); Harald Klode, Centerville, OH (US); Kevin Rehfus, Troy, OH (US)

(73) Assignee: Goodrich Corporation, Charlotte, NC (US)

( * ) Notice: Subject to any disclaimer, the term of this patent is extended or adjusted under 35 U.S.C. 154(b) by 669 days.

(21) Appl. No.: 14/067,003

(22) Filed: Oct. 30, 2013

(65) Prior Publication Data

US 2015/0115778 A1 Apr. 30, 2015

(51) Int. Cl.
| | |
|---|---|
| *H02K 7/06* | (2006.01) |
| *H02K 11/00* | (2016.01) |
| *B60T 13/74* | (2006.01) |
| *F16D 65/18* | (2006.01) |
| *H02K 7/08* | (2006.01) |
| *H02K 11/24* | (2016.01) |
| *B60T 8/17* | (2006.01) |
| *F16D 121/24* | (2012.01) |
| *F16D 125/36* | (2012.01) |

(52) U.S. Cl.
CPC ............... *H02K 7/06* (2013.01); *B60T 13/741* (2013.01); *F16D 65/18* (2013.01); *H02K 7/088* (2013.01); *H02K 11/24* (2016.01); *B60T 8/1703* (2013.01); *F16D 2121/24* (2013.01); *F16D 2125/36* (2013.01); *H02K 2205/03* (2013.01)

(58) Field of Classification Search
CPC .. B60T 13/741; B60T 8/1703; F16D 2121/24; F16D 2125/36; F16D 65/18; F16D 55/36; H02K 2205/03; H02K 7/06; H02K 7/088; H02K 11/001; H02K 11/0042; H02K 11/24
USPC ................................. 310/68 B; 188/156, 157
See application file for complete search history.

(56) References Cited

U.S. PATENT DOCUMENTS

| | | | | | |
|---|---|---|---|---|---|
| 3,522,460 | A | * | 8/1970 | Spurlin | ..................... B06B 1/04 310/29 |
| 3,679,279 | A | * | 7/1972 | Van Dorn | ............. F16C 27/066 384/537 |
| 4,546,296 | A | * | 10/1985 | Washbourn | ........... B60T 8/1893 188/162 |
| 4,682,065 | A | * | 7/1987 | English | .................... F16C 35/04 310/156.26 |

(Continued)

FOREIGN PATENT DOCUMENTS

| | | |
|---|---|---|
| EP | 1084949 | 3/2001 |
| EP | 1857705 | 11/2007 |
| JP | 61218358 A * | 9/1986 |

OTHER PUBLICATIONS

Extended European Search Report dated Jun. 8, 2015 in European Application No. 14190843.4.

*Primary Examiner* — Alex W Mok
(74) *Attorney, Agent, or Firm* — Snell & Wilmer L.L.P.

(57) ABSTRACT

An integrated actuator drive unit (ADU) assembly for an electric motor actuator is disclosed. The integrated ADU assembly may comprise at least one of an integrally formed ring gear, an integrally formed thrust bearing and integrally formed load cell. The integrated ADU assembly may comprise a portion of an electromechanical actuator. The electromechanical actuator may be utilized for aircraft braking systems.

7 Claims, 3 Drawing Sheets

(56) References Cited

U.S. PATENT DOCUMENTS

| | | | | |
|---|---|---|---|---|
| 4,784,244 | A | * | 11/1988 | Carre .................... B60T 13/741 188/156 |
| 4,953,669 | A | * | 9/1990 | Severinsson ............ B60T 13/04 188/158 |
| 6,581,730 | B1 | * | 6/2003 | Haydon .................. B60T 1/065 188/18 A |
| 7,364,020 | B2 | * | 4/2008 | Ante ..................... B60T 17/221 188/1.11 E |
| 7,565,953 | B2 | * | 7/2009 | Dalton .................. B60T 13/746 188/1.11 E |
| 2004/0154877 | A1 | * | 8/2004 | Severinsson ............ B60T 17/22 188/1.11 E |
| 2004/0163900 | A1 | * | 8/2004 | Beuerle ................. B60T 13/741 188/72.1 |
| 2005/0247529 | A1 | * | 11/2005 | Gaines .................... F16D 65/18 188/72.8 |
| 2006/0021831 | A1 | * | 2/2006 | Yamamoto .............. F16D 65/18 188/72.7 |
| 2006/0151260 | A1 | * | 7/2006 | Drennen ............... B60T 13/741 188/72.1 |
| 2009/0283603 | A1 | * | 11/2009 | Peterson ................ F24F 11/001 236/44 A |
| 2009/0284089 | A1 | * | 11/2009 | Wingett ................. H02K 7/106 310/77 |
| 2011/0132704 | A1 | * | 6/2011 | Hanlon .................. B60T 7/042 188/156 |
| 2011/0193433 | A1 | * | 8/2011 | Bohrer .................. H02K 3/522 310/71 |

* cited by examiner

INTEGRAL ACTUATOR DESIGN

FIELD

The present disclosure relates to braking systems and, more specifically, to a load cell, thrust bearing, and planetary ring gear composed integrally as part of an actuator drive unit (ADU) of an electromechanical actuator (EMA).

BACKGROUND

Typical electric motor actuators in aircraft and/or large vehicle (e.g., trains, commercial equipment, and/or the like) brake systems may employ a load cell that is installed within the actuator housing. When the actuator is engaged, the load cell is loaded in compression. Electromechanical actuators may comprise braking assemblies that forcefully move a translating member (e.g., such as a "ball nut") against a brake disk stack to generate an actuation force. This braking assembly may utilize an actuator. This actuation force drives the ball nut into forceful engagement with the brake disk stack to generate a braking torque. This actuation force loading may be sensed as strain measurement (e.g., indirectly) by a load cell.

SUMMARY

An integrated actuator drive unit ("ADU") assembly for an electric motor actuator is disclosed herein. The integrated ADU assembly may comprise at least one of an integrally formed ring gear, an integrally formed thrust bearing and integrally formed load cell. The integrated ADU assembly may comprise a portion of an electromechanical actuator. The electromechanical actuator may be utilized for aircraft braking systems. The electric motor actuator may include an electric motor actuator housing, a ball screw coupled to the electric motor actuator housing, a ball nut in communication with the ball screw and an actuator drive unit housing coupled to the ball screw to form a thrust bearing.

According to various embodiments, the actuator drive unit may include an ADU housing. At least a portion of the exterior surface of the ADU comprises a thrust bearing race. The actuator drive unit may include an integrally formed ring gear. Teeth of the ring gear may be formed along an interior surface of the actuator drive unit housing. The actuator drive unit may include an integrally formed load cell. The load cell may be defined by a portion of the actuator drive unit housing.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the drawing figures, wherein like numerals denote like elements.

DETAILED DESCRIPTION

Figure 1:
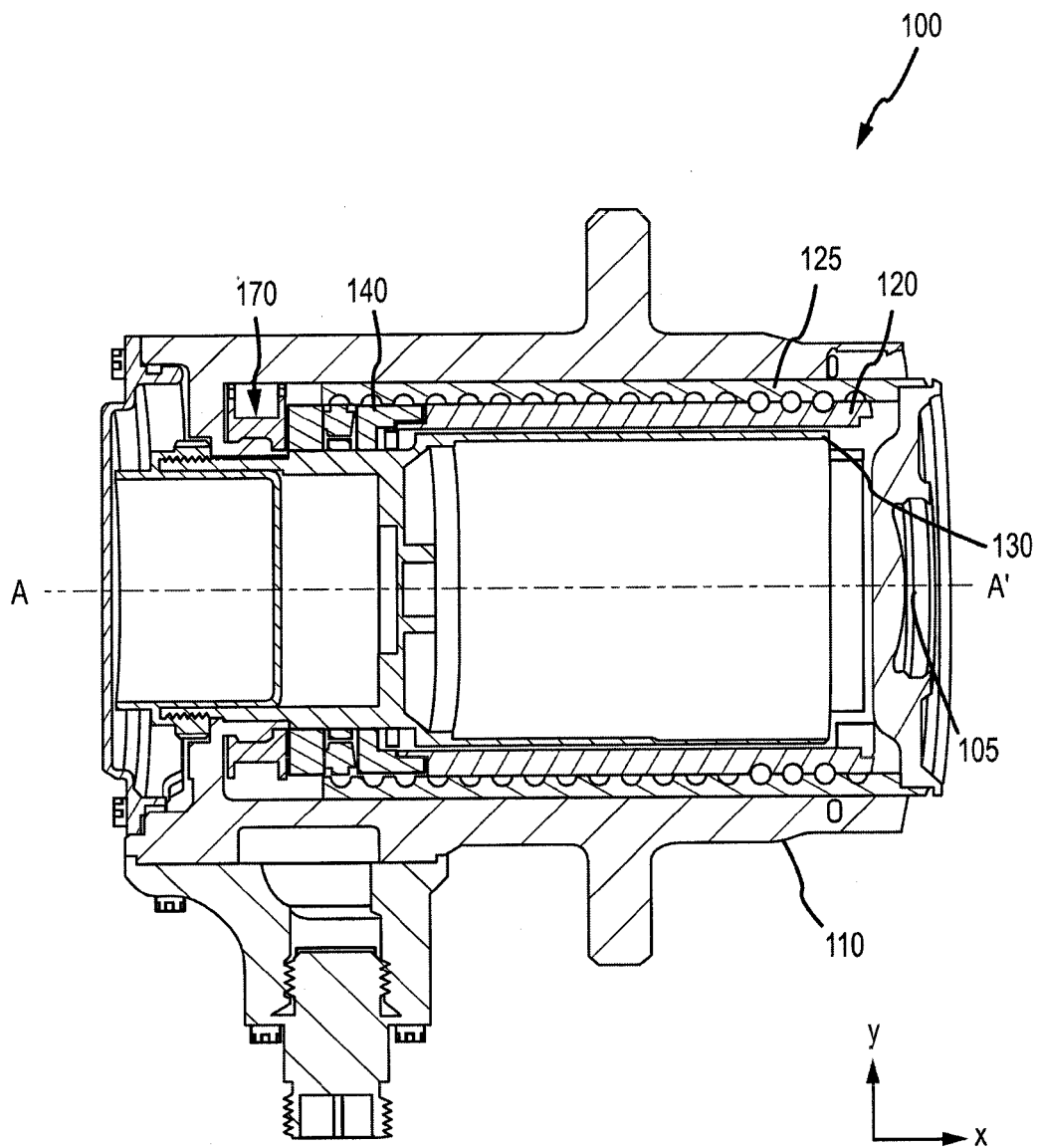
FIG. 1 illustrates a cross-sectional side view of a prior art electric motor actuator.

The detailed description of exemplary embodiments herein makes reference to the accompanying drawings, which show exemplary embodiments by way of illustration and their best mode. While these exemplary embodiments are described in sufficient detail to enable those skilled in the art to practice the inventions, it should be understood that other embodiments may be realized and that logical, chemical and mechanical changes may be made without departing from the spirit and scope of the disclosure. Thus, the detailed description herein is presented for purposes of illustration only and not of limitation. For example, the steps recited in any of the method or process descriptions may be executed in any order and are not necessarily limited to the order presented.

Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact.

As used herein, phrases such as "make contact with," "coupled to," "touch," "interface with" and "engage" may be used interchangeably.

In various embodiments, an aircraft wheel and brake system may comprise a non-rotatable wheel support, a wheel rotatably mounted to the wheel support, and a brake disk stack having alternating rotor and stator disks mounted with respect to the wheel support and wheel for relative axial movement. Each rotor disk may be coupled to the wheel for rotation therewith and each stator disk may be coupled to the wheel support against rotation. A back plate may be located at the rear end of the disk pack and a brake head may be located at the front end. The brake head may house a plurality of electric motor actuator ("EMAs") that further comprise reciprocating rams that extend to compress the brake disk stack against the back plate. Torque is taken out by the stator disks through a static torque tube or the like. An aircraft brake system may include the brake disk stack, the brake head, and at least one EMA mounted to, for example, the brake head. The EMA may include a housing, a reciprocating ram and a motive device operatively connected to the reciprocating ram for selectively moving the reciprocating ram into and out of forceful engagement with the brake disk stack for applying and releasing braking force. The EMA may be mounted to a surface of the brake head that is parallel to a friction surface of the brake disk stack.

In various embodiments, an EMA may be coupled to or otherwise operate a force generating device such as, for example, a ball screw, a ram, and/or the like. In operation, the EMA may cause the force generating device to move and/or exert a force on other brake system structure such as, for example, a brake disk or pad to exert a stopping force on a wheel or other suitable moving structure. This stopping force may load and/or exert a corresponding force on the EMA structures such as, for example, an EMA housing. This load may also be measured by measuring strain to determine the amount of braking force being applied when the brake system is activated.

In various embodiments and with reference to FIG. 1, a cross-sectional schematic view of a conventional EMA 100 is shown. The EMA 100 may comprise an EMA housing 110, an actuator drive unit ("ADU") housing 130, a ball nut 125, a ball screw 120, and a disc or "puck" 105. The EMA housing 100 may comprise a generally annular structure configured to house the ball nut 125 and extend along the axis A-A'. The ball nut 125 may comprise a generally annular housing that extends axially along the axis A-A' within the EMA housing 110. The ball screw 120 may comprise a generally annular housing that extends axially along the axis A-A' within the ball nut 125. The ADU housing 130 may comprise a generally annular housing that extends axially along the axis A-A' at least partially radially inward of the ball screw 120. An inner surface of the ball nut 125 may be helically threaded. Likewise, an outer surface of the ball screw 120 may be helically threaded. As described above, the ball screw 120 may be housed within the ball nut 125 and the threading on the outer surface of the ball screw 120 may interface with or mate with the threading on the inner surface of the ball nut 125. A variety of discrete components may be coupled to the ADU housing 130 within the EMA 100, such as, for example, thrust bearing 140, a load cell 170, ring gear and/or gearing system, and the like.

A portion of the EMA 100 is assembled from the following main sub-systems that exist as separate components: The motor (ADU) housing 130 is fitted with a planetary ring gear, which is then secured with multiple roll pins that are inserted through the ADU housing 130 into the ring gear body. These pins are the primary means of torque transfer between the ring gear and the ADU housing 130. The EMA assembly 100 is then completed by adding additional components (e.g. motor and resolver). The (roller) thrust bearing 140 is fitted to the ball screw 120 and subsequently secured by welding (e.g. via Laser, EBM, etc.). The thrust bearing 140 comprises rolling elements, a main bearing race, a main bearing cage, a preload ball bearing assembly and a preload spring. These are assembled as separate items. The load cell 170 is then fitted into the EMA housing 110. Ball screw 120 and ADU housing 130 are subsequently added and secured to the EMA 100 with the retention nut.

During operation, the ball screw 120 may rotate about an axis A-A'. As the ball screw 120 rotates, the threading in the ball screw 120 may cooperate with the threading in the ball nut 125 to drive the ball nut 125 in a distal direction. As the ball nut 125 translates distally, the puck coupled to the ball nut 125 may also translate distally. The puck may contact a brake stack (e.g., of an aircraft wheel) to apply force to the brake stack configured to apply a clamping force on a wheel thereby slowing and/or halting the rolling motion of the aircraft wheel.

Figure 2:
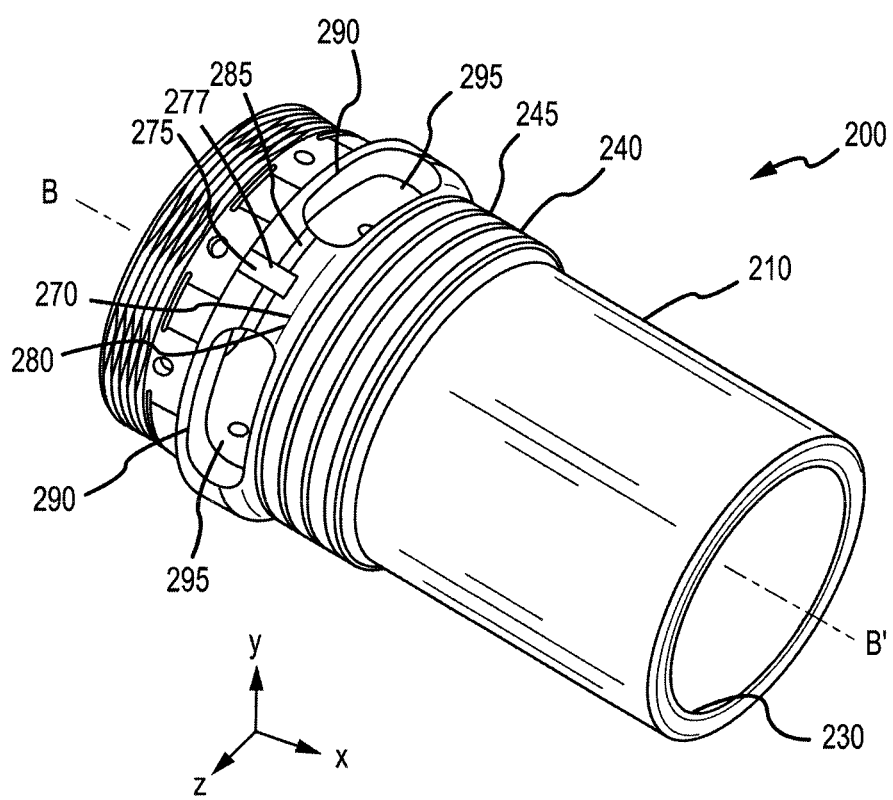
FIG. 2 illustrates a perspective view of an electric motor actuator having an integrated load cell, thrust bearing, and planetary ring gear, in accordance with various embodiments.

In various embodiments and with reference to FIG. 2 an integrated ADU assembly 200 is depicted. Integrated ADU assembly 200 is configured to receive a motor and resolver to the ADU housing 210. Integrated ADU assembly 200 may comprise at least one of an integrally formed ring gear 230, an integrally formed thrust bearing 240 and integrally formed load cell 270.

The ring gear 230 comprises a portion of a planetary gear pack generally disposed annularly around the interior of ADU housing 210 near an open end proximate to end B' of axis B-B'. The planetary ring gear 230 may be machined into the ADU housing 210 to obtain reactionary support and a part count reduction (and cost reduction) in the EMA 300 (see FIG. 3). In association with a planetary gear transmission, the ring gear 230 is configured to translate the reactionary load of the planet gears that rotate in the ring gear. A planetary gear system increases the torque from the motor to generate the load on the ball nut 225. The teeth 250 of the ring gear 230 may be integrally formed in the interior diameter of the ADU housing 210. In this way, the pins which were historically used, such as in EMA 100, as the primary means of torque transfer between the ring gear and the ADU housing 130 are eliminated. EMA 300 may be more reliable as historical ring gear retaining pins have been known to break loose allowing the ring gear to rotate in the ADU housing 110 thereby preventing the application of full load. This failure mode is eliminated in the design of integrated ADU assembly 200.

Figure 3:
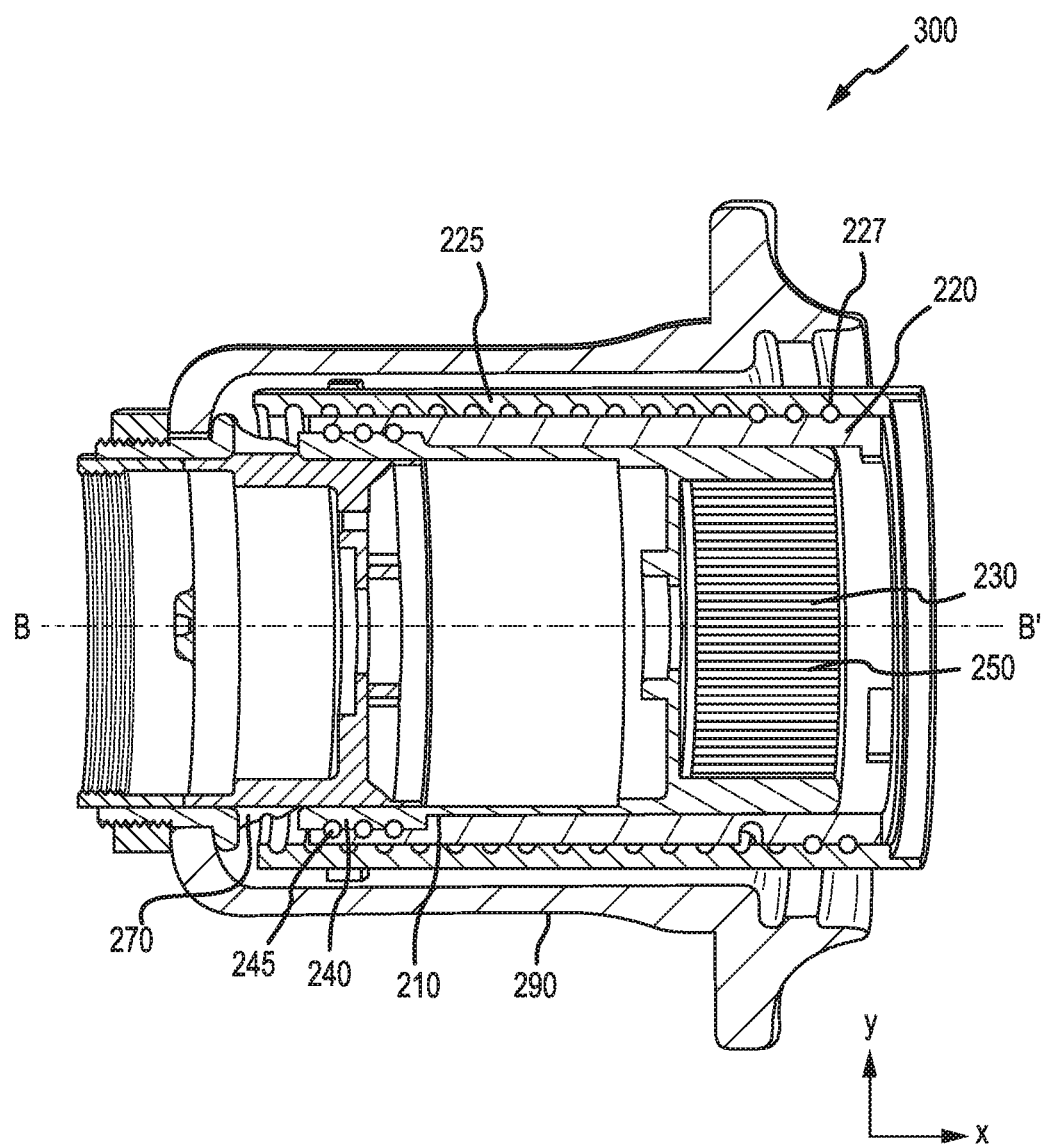
FIG. 3 illustrates a cross-sectional side view of an EMA assembly having a load cell, thrust bearing, and planetary ring gear composed integrally as part of an actuator drive unit (ADU), in accordance with various embodiments.

The thrust bearing assembly of integrated ADU assembly 200 is formed by inserting thrust bearing balls into the thrust bearing races 245 (stationary race) between ADU housing 210 and ball screw 220 (with brief reference to FIG. 3). Ball nut 225 may communicate with ball screw 220 via a bearing race 227. The integrated ADU assembly 200 to ball screw 220 is assembled by insertion of ball bearings. This assembly is then secured to the EMA housing 290, such as via the use of a retention nut.

With renewed reference to FIG. 2, integrated ADU assembly 200 may comprise an integral load cell 270. The integrated load cell may be any desired shape. According to various embodiments, ADU housing 210 comprises a plurality of columns 280, such as four generally equally spaced columns. Columns 280 may be formed through the incorporation of open areas 295 defined by a perimeter 290 located between two annularly spaced apart adjacent columns 280 in load cell 270. These open areas 295 may be configured to direct the force through the load cell 270. Stated another way, columns 280 may be configured to funnel the compressive loads of integrated ADU assembly 200 directly through the load cell 270 strain gauge 277. Strain gauge 277 may be configured to measure load in any suitable direction relative to axis B-B'. For instance, strain gauge 277 may be configured to measure at least one of a linear load and a bending load on ADU housing 210. In this way, the design geometry of the columns 280 can be altered, designed and controlled to affect the gain output of the load cell 270 function. Load cell 270 may comprise at least one sensor, such as a strain gauge 277, mounted within/on a portion of load cell 270, such as on/within column 280. These strain gauges may be located at any location along the surface ADU housing 210, such as approximately 90° and/or approximately 180° apart about the annular surface of the ADU housing 210. The strain gauges 277 may be flush mounted through the use of a recess 275 formed in the column 280 configured to receive the stain gauge 277. Wiring channels 285 coupled to the recess 275 may assist with the orienting of wired electrical connections. ADU housing 210 having installed strain gauges 277 wired to a power source and/or controller may form the load cell 270.

Load cell 270 strain gauge 277 can be electrically coupled to other systems, such as a power source and/or controller as wires may be routed through columns 280 and/or wiring channels 285 simplifying the wiring connections during the EMA 300 assembly process. A flex circuit board may be utilized to reduce manufacturing costs (versus hand wiring the strain gauges).

In various embodiments, strain gauges 277 may be installed on/in ADU housing 210 and/or recess 275 in any suitable fashion. For example, a bonding film such as a polyimide film (e.g., M PLY-001 KAPTON film from E. I. du Pont de Nemours and Company) may be installed on ADU housing 210 at a suitable location for strain gauge 277 installation. More specifically, the bonding film may be installed at each desired strain gauge 277 location. The bonding film may be added for environmental and/or electrical protection.

In various embodiments, at least portions of strain gauges 277, wires, and wiring recess 275 may be covered by a coating, tape, protectant and/or the like to protect the strain gauges 277, wires, and wiring terminals from environmental exposure (e.g., temperature, contaminants, and/or the like). In this regard, at least portions of strain gauges 277, wires, and wiring terminals may be covered by a tape such as, for example, a high temperature tape. At least portions of the strain gauges 277, wires, and wiring terminals may also be coated and/or sealed with a suitable sealer such as silicon.

The integration of the thrust bearing races 245, which are located nearer end B' of axis B-B' as compared with the columns 280 of load cell 270, provide a direct path of the load through the columns 280 and thus the strain gauge 277 thereby provide measurement of transmitted loads. The integration of the load cell 270 increases strain gauge 277 measurement accuracy since the load cell 270 no longer has the capability to move relative to the integrated ADU assembly 200 due to vibration, shock, and/or the like. It is known that these relative movements between the load cell 270 and the thrust bearing 240 and housing 210 can lead to load cell 270 measurement errors (e.g. measurements can drift high or low). Prior art load cells, such as load cell 170, were typically installed as separate components inside the actuator housing, such as actuator housing 110, at the bottom end (e.g. end located nearest end A of axis A-A') of the housing. These prior load cells 170 may be susceptible to calibration and zero shifts of load measurements because the load path of the prior load cells 170 varied due to deflection, edge loading, and movement of the load cell 170 within the actuator housing 110.

Integrated ADU assembly 200 is configured to enable increased power density. Integrated ADU assembly 200 is configured to result in a weight and package size (e.g. EMA 300 size) reduction beneficial in aircraft brake applications. In various embodiments, the present disclosure provides an EMA 300 with weight and space savings. Moreover, EMA 300 significantly reduces manufacturing and/or instrumentation time. In various embodiments, the systems and elements described herein may provide overall cost savings as compared to prior load cell systems.

In operation, utilizing integrated ADU assembly 200, load is transferred through the EMA as follows: puck (not shown), end-cap (not shown), ball nut, ball screw, thrust bearing (rotating race) to the ADU housing that contains the thrust bearing (stationary race), then through the integral columns that house the strain gauges that measure the applied load. Relative movement between the load cell 270 and the thrust bearing 240 is eliminated and is also easier to control between the load cell 270 and the EMA housing 290.

In various embodiments, while the integrated ADU assembly 200 described herein has been described in the context of aircraft applications, one will appreciate in light of the present disclosure, that the integral housing load cells described herein may be used on various other vehicles such as, for example, trains. Moreover, the integral housing load cells described herein may be employed with any suitable electric motor actuator in any installation. Thus, in various embodiments, the integral housing load cells described herein provide a cost effective and reliable electric motor actuator.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the inventions. The scope of the inventions is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Systems, methods and apparatus are provided herein. In the detailed description herein, references to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f), unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:
1. An electric motor actuator comprising:
an electric motor actuator housing;
a ball nut coupled to the electric motor actuator housing;
a ball screw in communication with the ball nut via a race; and
an actuator drive unit housing coupled to the ball screw to form a thrust bearing,
wherein the actuator drive unit housing comprises an integrally formed ring gear, an integrally formed thrust bearing race, and an integrally formed load cell, wherein the actuator drive unit housing forms a column of the integrally formed load cell.
2. The electric motor actuator of claim 1, wherein the integrally formed load cell comprises a plurality of columns defined by openings between adjacent columns.

3. The electric motor actuator of claim 2, wherein at least one of the plurality of columns is configured to orient the direction of force through the integrally formed load cell.

4. The electric motor actuator of claim 1, wherein the integrally formed load cell comprises a channel configured to route a sensor wire.

5. The electric motor actuator of claim 1, wherein the column of the integrally formed load cell defines a recess, and wherein a strain gauge is disposed within the recess.

6. The electric motor actuator of claim 1, further comprising a sensor flush mounted on the actuator drive unit housing within a recess.

7. The electric motor actuator of claim 1, wherein teeth of the integrally formed ring gear are formed in an interior surface of the actuator drive unit housing.

* * * * *